Nov. 21, 1950   A. G. FINIGAN ET AL   2,530,762
LOCOMOTIVE CAB CONSTRUCTION
Filed Dec. 29, 1943   3 Sheets-Sheet 1

Inventors
Andrew G. Finigan,
Frank Beuchtel &
Martin P. Blomberg
By Blackmor, Spencer & Flint
Attorneys Nov. 21, 1950  A. G. FINIGAN ET AL  2,530,762
LOCOMOTIVE CAB CONSTRUCTION
Filed Dec. 29, 1943  3 Sheets-Sheet 2

Inventors
Andrew G. Finigan,
Frank Bruchtel &
Martin P. Blomberg
By Blackmor, Spencer & Flint
Attorneys Nov. 21, 1950 A. G. FINIGAN ET AL 2,530,762
LOCOMOTIVE CAB CONSTRUCTION
Filed Dec. 29, 1943 3 Sheets-Sheet 3

Inventors
Andrew G. Finigan,
Frank Beuchtel &
Martin P. Blomberg

By Blackmore, Spencer & Flint
Attorneys

Patented Nov. 21, 1950

2,530,762

UNITED STATES PATENT OFFICE 2,530,762

LOCOMOTIVE CAB CONSTRUCTION

Andrew G. Finigan, Berwyn, Frank Bruchtel, Oak Lawn, and Martin P. Blomberg, Hinsdale, Ill., assignors to General Motors Corporation, Detroit, Mich., a corporation of Delaware Application December 29, 1943, Serial No. 516,008

5 Claims. (Cl. 105—396)

This invention relates to Diesel-electric locomotives and particularly to the frame structure of the cab or front end thereof. The object of the invention is to construct as a unit a separable or independently built nose or cab which can later be assembled onto and secured to the main frame section of the bodywork of the locomotive.

In prior practice it has been customary to build the entire locomotive body as a complete assembly or unit, and this unit included the nose or cab. According to the present invention, the underframe and the main body part are constructed of a number of subassemblies into one unit or assembly and the nose or cab at the front of the locomotive is constructed of a number of subassemblies into a second unit or assembly. The two units or assemblies are so constructed that they mate or interfit and can be juxtaposed and united by welding, bolting, or riveting. This construction has the advantage of enabling the nose subassembly to be made at any time and kept on hand for new constructions or to repair old ones.

In the novel construction, the lines of separation, or lines of joining, between the two subassemblies are in different planes; instead of H beams, two channel irons are used and in assembling the cab to the main body section, the channels fit back to back and are secured together in this position; the side plate of the cab or nose assembly abuts or overlies the side plate of the body and is secured thereto; and the rear section of the cab roof overlies the fore part of the body unit and is secured thereto.

Figure 1:
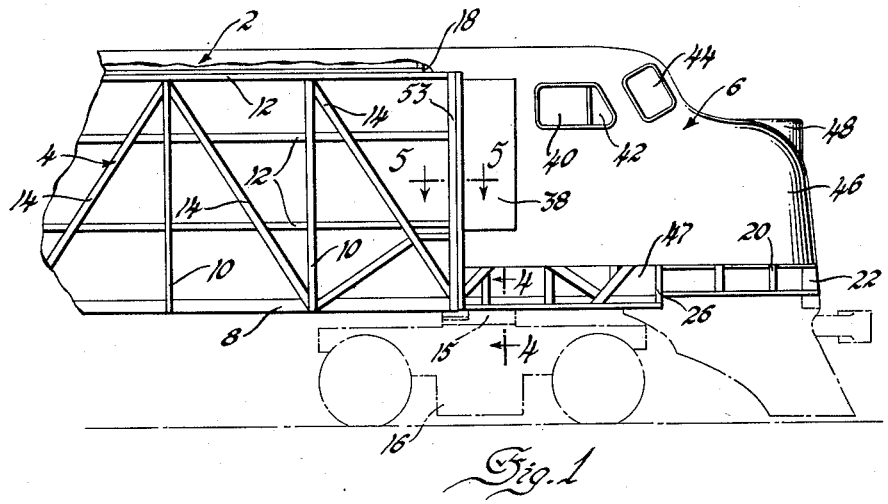
Figure 1 is a side view of the fore part of a Diesel-electric locomotive with a part of the outer skin removed better to show the construction.
Figure 2:
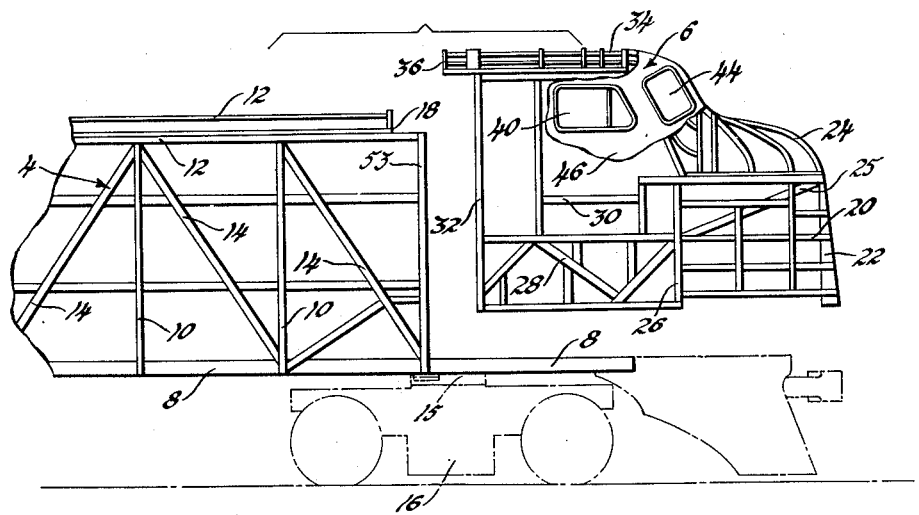
Figure 2 is a view similar to Figure 1, but showing the nose or cab unit spaced from the main bodywork to indicate the lines of junction between the two units.

Referring to Figures 1 and 2, the locomotive is indicated at 2 and comprises the main body part 4 and the nose or cab 6 at the front of the locomotive. The framework of the main body part comprises a body underframe subassembly 8 and body side frame assemblies. The underframe subassembly 8 includes the usual bolsters (not shown) having centerplates, one of which is shown at 15. The centerplates 15 are pivotally supported on trucks, one of which is shown at 16. Each of the body side frame assemblies comprises uprights or posts 10 and 53, longitudinal members 12 and diagonal members 14 which are secured together by rivets or by welding to form a truss or bridge type body side frame subassembly. The lower ends of the posts and diagonals 10—53—14 of the side frame subassemblies are secured to the underframe 8 by rivets or by welding. The lower ends of the forward uprights or posts 53 of each of the side frame subassemblies are secured by rivets or by welding to opposite ends of the bolsters of the underframe and serve as bolster posts. At the front top corner the upright and longitudinal members form a stepped construction 18 as is best shown in Figure 2.

Figure 3:
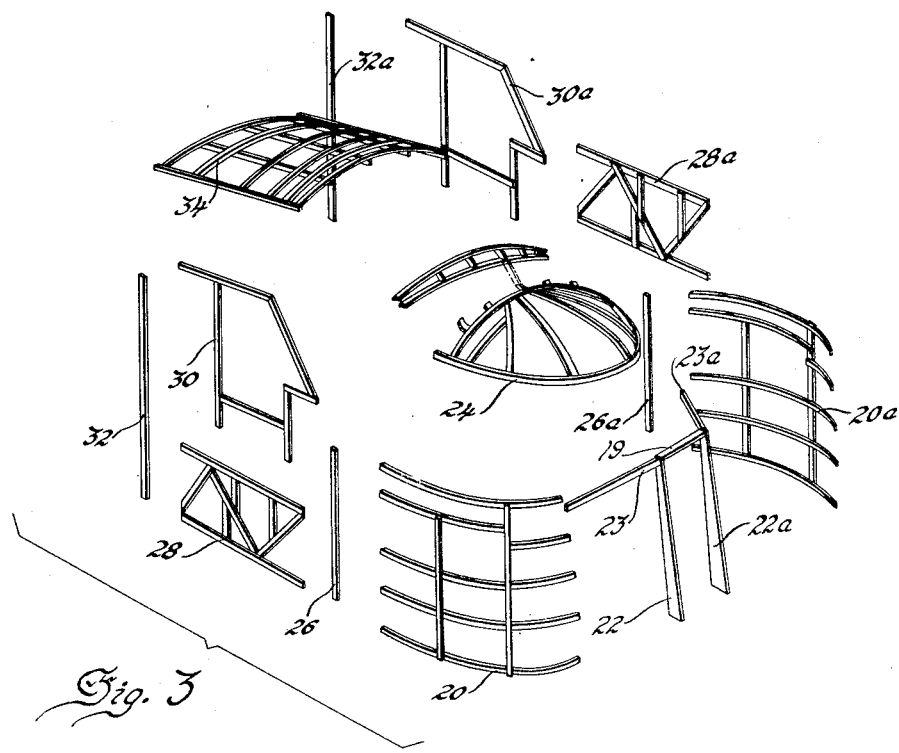
Figure 3 is an expanded view of the cab or nose assembly, showing most of the subassembly units which make up the frame of the cab.

Part of the nose frame or forepart 6 of the locomotive is shown in detail in Figure 3. The individual subassessmblies which make up the cab frame are the two lateral front curved sections 20 and 20a; the fore upright or collision posts 22 and 22a to which the curved sections 20 and 20a are connected; the top cross beam 19 and lateral beams 23 and 23a; the covering frame 24 which fits over beams 19, 23 and 23a and the sections 20, 20a, 22 and 22a and is secured thereto; the inclined beams 25 (see Figure 2) joined to the collision posts 22, 22a and adjacent structure; the lateral uprights 26 and 26a which are secured to the rear ends of the curved sections 20 and 20a; the lower longitudinal frame units 28 and 28a which are secured at their front ends to the uprights 26 and 26a; the upper lateral frame sections 30 and 30a which are secured to parts 20, 20a, 24, 26, 26a, 28 and 28a; the rear uprights or bolster posts 32 and 32a which are secured to the sections 28, 28a, 30 and 30a; and the roof frame section 34 which is secured to the adjacent parts 24, 30, 30a, 32 and 32a. The individual subassemblies 20, 24, etc., are comprised of the upright longitudinal, diagonal and/or curved metal members as shown in the drawing and the cross-sectional shape of those members may be of any suitable profile, such as rectangular, L-shaped, channel-shaped, round or tubular, etc. The individual members of the subassemblies shown in Figure 3 are placed in a jig and secured together, and then the assembly is removed from the jig. All the individual subassemblies 20, 24, 26, etc., are then placed in another jig and joined to each other by welding to form the framework of the cab or nose 6. The structure will now appear as shown in Figure 2.

The collision posts 22, 22a, the beams 19, 23, 23a, and the beams 25 form a collision frame.

At the front of the cab a door is provided between the collision posts 22 and 22a and the beam 19.

In the assembled cab frame structure, there is a rearwardly projecting peak portion 36, which comprises the rear end of the section 34. This peak portion is constructed to fit snugly into the stepped part 18 of the framework of the main body part 4.

Figure 4:
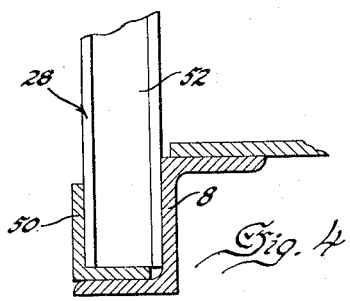
Figure 4 is a sectional detailed view on the line 4—4 of Figure 1, showing the manner of joining the cab to the side sill.

The lower part of the frame sections 28 and 28a of the cab project downwardly a short distance below the adjoining subsections 20 and 20a and the individual parts 50 and 52 thereof laterally overlap the underframe 8 (as is best shown in Figures 1 and 4) and are secured thereto in any suitable way such as by bolts or by welding.

Figure 5:
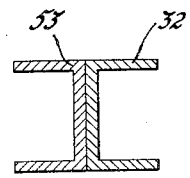
Figure 5 is a sectional view on the line 5—5 of Figure 1, showing the connection between the rear upright of the cab and the front upright of the main body frame.

In the final assembly, the parts 32 and 32a of the cab abut snugly against the adjacent uprights 53 of the main frame. The parts 32, 32a and 53 are made of channel-shaped iron as shown in Figure 5, and are assembled in back to back relation and are bolted or welded together in this position. Similarly, the abutting parts at the peak portion 36 and the stepped part 18 are united either by bolting or welding.

When the cab unit is secured to the body unit, the individual longitudinal members of the cab unit are in alignment with the longitudinal members of the body unit.

The cab or nose is provided with doors 38 (one on each side), side windows 40, ventilating windows 42 and front windows 44. A headlamp is shown at 48. The frame of the cab is covered by the usual sheet metal covering or skin 46 which is secured to the cab framework preferably before the units 4 and 6 are joined. This covering does not extend all the way to the bottom as shown at 47 to enable the fastening of the frame elements to the underframe 8 during assembly.

Figure 6:
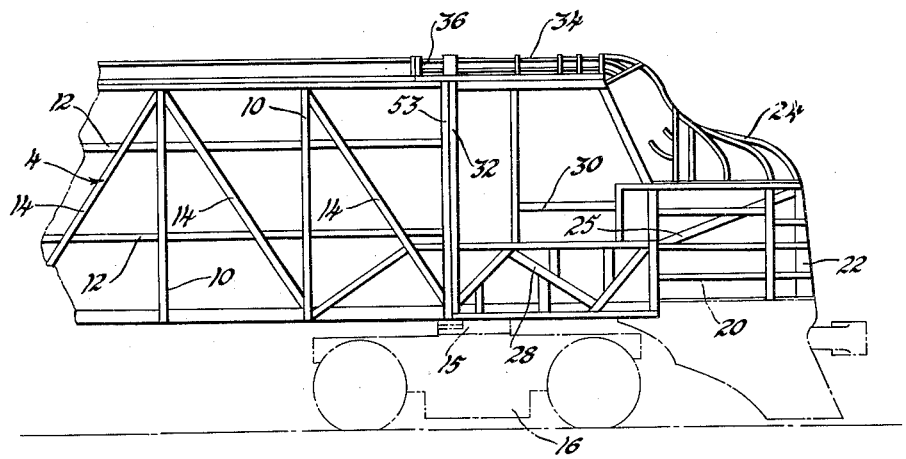
Figures 6 and 7 are side views similar to Figures 1 and 2, respectively, of a modification.
Figure 7:
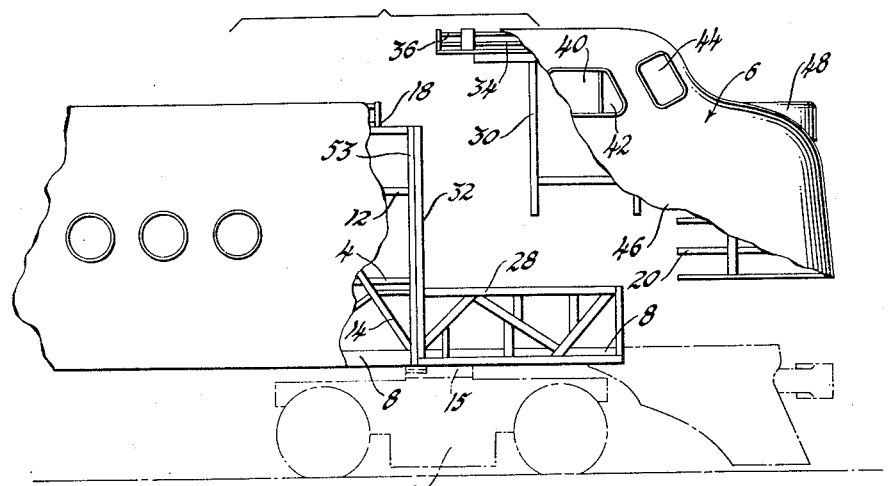

Figures 6 and 7 show a modification. In this species the subassemblies 28, 28a, 32 and 32a are first secured directly as a subassembly to the main body frame 4, or these four subassemblies 28, 28a, 32 and 32a can be constructed as an integral part of the main frame 4. The remainder of the subassemblies as shown in Figure 3 are then secured together and the whole assembled on the locomotive as shown in Figure 7. When the parts are in abutting relation they are secured together either by bolting or welding.

We claim:

1. In a fabricated body frame for a railway vehicle, a body underframe subassembly, body side frame subassemblies and a body nose and cab frame subassembly including collision frame members connecting the outer end and lower side frame members thereof, said body side frame and said body nose and cab frame subassemblies being connected to the sides of said body underframe subassembly and having horizontally overlapping adjacent end members secured together in abutting relation.

2. In a fabricated body frame for a railway vehicle, a body underframe subassembly, body side frame subassemblies of truss form including upper horizontal members, diagonal members and intermediate and end posts, said diagonal members, intermediate and end posts being connected at the upper ends to said horizontal members and a body nose and cab frame subassembly including inner end posts, outer end collision posts and diagonal members secured between said collision posts and lower side members of said body nose and cab frame subassembly, the lower side frame members of said body nose and cab frame subassembly and the lower end of the diagonal and intermediate and end posts of said body side frame subassemblies being secured along the sides of said body underframe subassembly and the adjacent end posts of said side frame and said body nose and cab frame subassemblies being secured together in abutting relation.

3. In a fabricated body frame for a railway vehicle, a body underframe subassembly, a body nose and cab frame subassembly forming outer end cab window frames, a cab roof frame and cab side door and window frames, and a rounded outer end nose frame projecting outwardly below said outer end cab window frames and including a central collision frame forming a lower outer end door frame, said roof frame having an inner end projection and body side frame subassemblies, said body nose and cab frame subassembly being secured along the sides of said underframe subassembly and the adjacent ends of said body side and nose and cab subassemblies overlapping horizontally and being secured together in abutting relation.

4. In a fabricated body frame for a railway vehicle, a body underframe subassembly, body side frame subassemblies secured along opposite sides of said body underframe subassembly and spaced from one end thereof, a body nose and cab frame subassembly secured along the sides of said body underframe subassembly at the end thereof adjacent said body side frame assemblies, said body nose and cab frame subassembly horizontally overlapping said body side frame assemblies and secured in overlapping abutting relation thereto, said body nose and cab frame subassembly forming upper outer end window, upper side window and side door frames, a roof frame above said window and door frames and forming the overlapping connection with said body side frame assemblies and a lower rounded nose frame projecting outwardly below said upper end window frames and the end of said body underframe subassembly, said rounded end nose frame including upright collision posts and transverse connecting members forming a lower outer end door frame and diagonal members connecting said collision posts to the lower frame members of said body nose and cab frame subassembly to the sides of said body underframe subassembly.

5. In a fabricated body frame for a railway vehicle having center plate supporting means adjacent the ends thereof, a fabricated body nose and cab frame subassembly forming a rounded upper roof frame and including backwardly projecting side connecting members, side frame members forming upper side cab window and door frames, the lower side frame members being secured in overlapping relation with the sides of said underframe subassembly adjacent one end thereof, upper end cab frame members extending downwardly and forwardly from said roof frame members and forming forwardly facing window frames and curved nose frame members projecting forwardly of said forwardly facing window frames and end of said underframe subassembly, said curved nose frame members including transversely spaced collision posts and an upper transverse connecting member forming a lower forwardly facing central door frame and members connecting the upper ends of said collision posts to the lower side frame members secured to said underframe subassembly, a cover sheet secured only to the upper portion of said body nose and cab frame subassembly and spaced from the lower side frame members to facilitate securing these members to the sides of said underframe assembly, said cover sheet having openings for said door and window frames, and body side frame subassemblies of truss form secured along each side of said body underframe subassembly to the rear of said body nose and cab frame subassembly and having vertical and horizontal members abutting and connected to the side frame members and backwardly projecting connecting members of said roof frame of said body cab and nose frame subassembly.

ANDREW G. FINIGAN.
FRANK BRUCHTEL.
MARTIN P. BLOMBERG.

REFERENCES CITED

The following references are of record in the file of this patent:

UNITED STATES PATENTS

| Number | Name | Date |
|---|---|---|
| 832,623 | Prouty | Oct. 9, 1906 |
| 2,075,939 | Heyner | Apr. 6, 1937 |
| 2,101,557 | Massey et al. | Dec. 7, 1937 |
| 2,110,019 | Hoblitzelle | Mar. 1, 1938 |
| 2,197,708 | Ragsdale et al. | Apr. 16, 1940 |
| 2,294,357 | Dean et al. | Aug. 25, 1942 |